April 15, 1958  C. L. MOORMAN ET AL  2,830,832
FLUID SEAL
Filed July 1, 1955  2 Sheets-Sheet 1
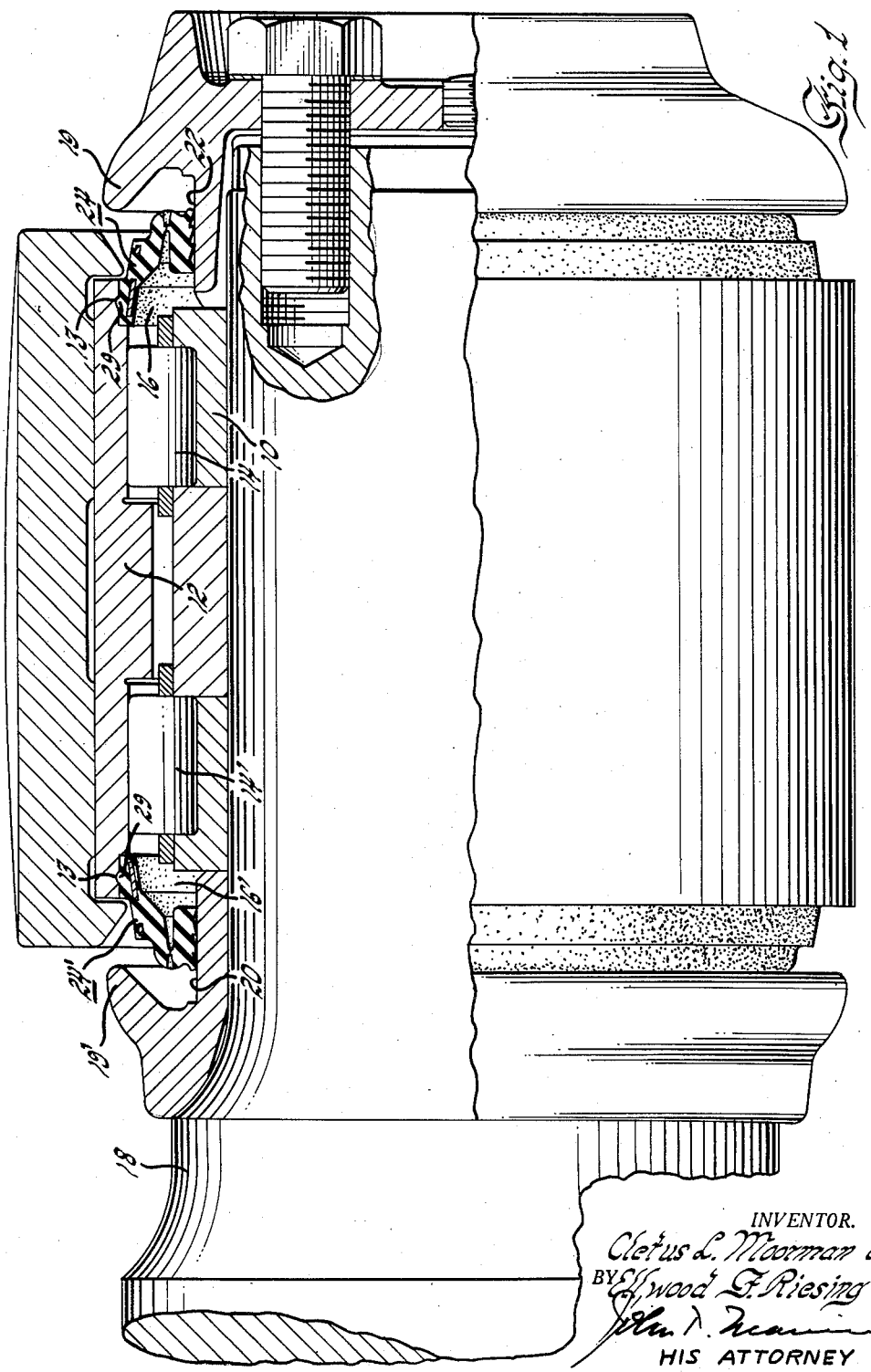
INVENTOR.
Cletus L. Moorman and
BY Elwood F. Riesing
HIS ATTORNEY April 15, 1958  C. L. MOORMAN ET AL  2,830,832
FLUID SEAL
Filed July 1, 1955  2 Sheets-Sheet 2
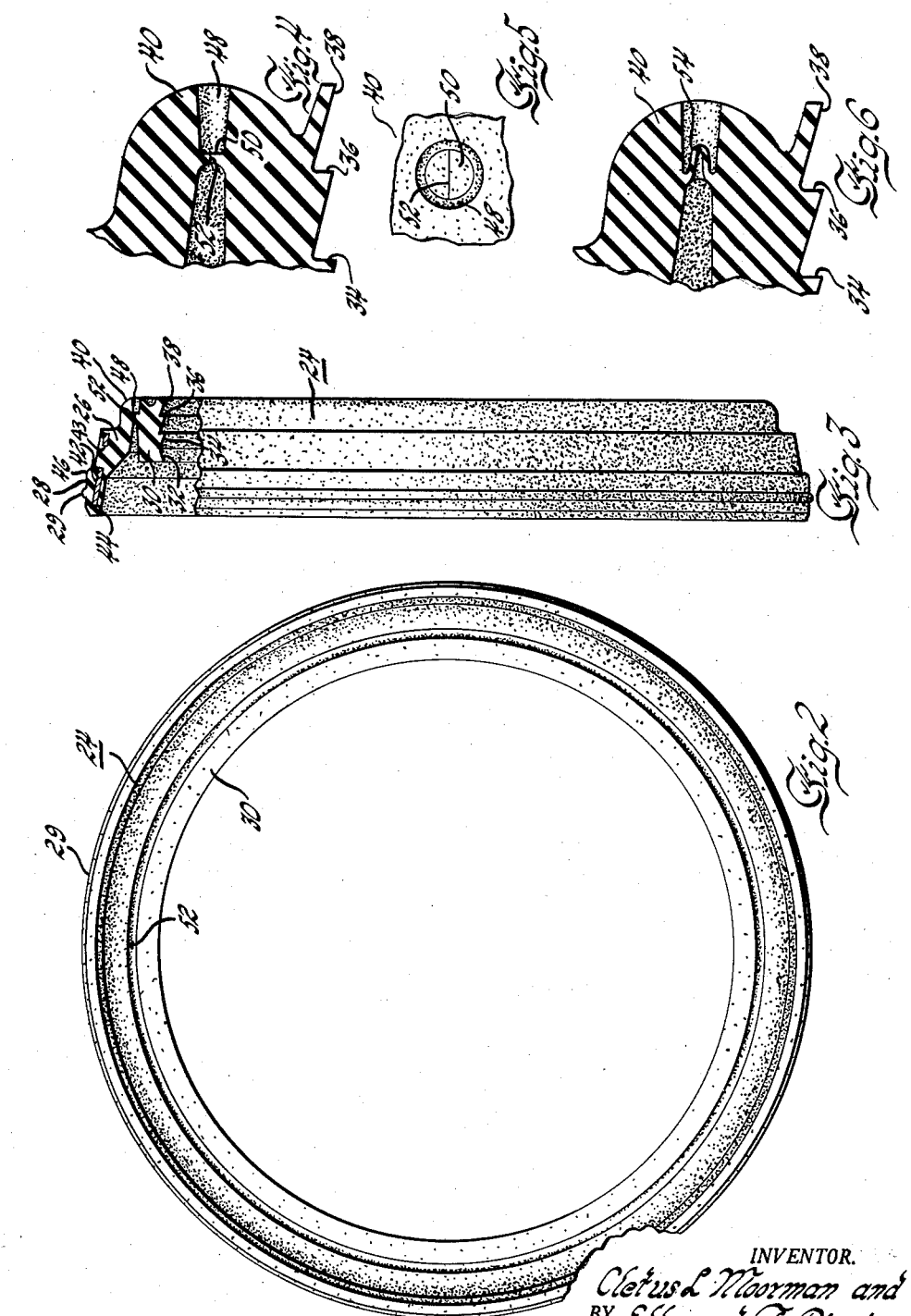
INVENTOR.
Cletus L. Moorman and
BY Ellwood F. Riesing
John T. Mann
HIS ATTORNEY

United States Patent Office 2,830,832
Patented Apr. 15, 1958

2,830,832

FLUID SEAL

Cletus L. Moorman, Trotwood, and Ellwood F. Riesing, Dayton, Ohio, assignors to General Motors Corporation, Detroit, Mich., a corporation of Delaware Application July 1, 1955, Serial No. 519,572

2 Claims. (Cl. 286—11)

This invention relates to fluid seals and in particular to seals for sealing a lubricant chamber between a pair of relatively rotatable members wherein considerable pressures are developed within the lubricant chamber.

It is conventional practice to install a seal at one or both ends of an annular lubricant chamber between antifriction bearing race members for retaining lubricant within the bearing and for preventing ingress into the bearing of dirt and other deleterious material. Some bearing installations, as for example, railroad car axle journal boxes develop, in the course of operation, relatively high temperatures and considerable pressures due to the expansion of air and lubricant therein. Further, operating conditions of such bearing installations make desirable that lubricant be injected into the bearing at relatively high pressures in order that thorough lubrication of the bearings be accomplished in a minimum time. It has been the practice to provide such bearing installations with expensive metal pressure release fittings with attendant dust and water exclusion features and antifreeze attachments to release pressures developed in the lubricant chamber so as to prevent the oil seals from being blown out and to permit lubricant to adequately fill the lubricant chamber. The present invention eliminates the need for these pressure release features and antifreeze attachments and, thus, simplifies the construction of such bearing installations.

It is the object of this invention to provide a simply constructed and inexpensive oil or grease seal for sealing the lubricant chamber between relatively rotatable members which has incorporated therewith a pressure release means which is effective in relieving pressures developed within the lubricant chamber and in preventing the ingress into the lubricant chamber of dirt and other deleterious material.

It is a further object of this invention to provide a seal for sealing the lubricant chamber between relatively rotatable members which includes a relatively thin apertured diaphragm portion operative to release pressures from the lubricant chamber and to prevent the ingress of dirt and other deleterious materials into the lubricant chamber.

It is another object of this invention to provide an antifriction bearing assembly having a lubricant chamber closed by an oil or grease seal including means for holding the seal securely within the bearing assembly and an apertured or slitted diaphragm means in the body of the seal which is operative to relieve pressures developed within the lubricant chamber and to prevent the ingress of dirt and other deleterious materials into the lubricant chamber.

Further objects and advantages of the present invention will be apparent from the following description, reference being had to the accompanying drawings wherein preferred embodiments of the present invention are clearly shown.

In the drawings:

Figure 1 is an elevation in partial cross section showing the seal of the present invention associated with a journal box in operating position.

Figure 2 is a side elevational view of the seal.

Figure 3 is a front elevational view of the seal with a portion shown in cross section.

Figure 4 is an enlarged cross sectional fragmentary view of a diaphragm portion of the seal shown in Figure 3.

Figure 5 is a side view of the diaphragm portion shown in Figure 3.

Figure 6 is another type of diaphragm which may be used with the present invention.

The seal of the present invention is shown in the drawings in terms of a specific embodiment designed for sealing a railway journal box of conventional construction. However, it will be obvious that the present seal is of general applicability and may be readily modified to suit a particular installation for particular operating conditions.

Referring to Figure 1, a roller bearing assembly having an inner race 10, an outer race 12 and roller bearings 14 and 14', interposed therebetween, form lubricant chambers 16 and 16'. The roller bearing assembly is fitted over a shaft 18 which has a hub and guard ring 19 having a cylindrical sealing surface 22, fitted on one side of the bearing assembly and a sleeve and guard ring 19' having a cylindrical sealing surface 20, fitted on the other side of the bearing assembly. The lubricant chambers 16 and 16' are sealed from the atmosphere by identical elastomeric seal members 24 and 24'.

Referring to Figures 1, 2 and 3, seal member 24 has an annular axially elongated elastomeric body portion 26 which has an axial portion 28 at the axial inner end or lubricant chamber end thereof, the external diameter of which is of somewhat greater dimension than the internal diameter of the outer bearing race 12 portion with which it is forcibly inserted so that seal 24 engages the outer bearing race resiliently and snugly to provide an effective seal between the parts.

The seal member 24 includes a relatively heavy axially elongated ring portion 30 having a plurality of sealing lips 32, 34, 36 and 38 formed on inner radial surfaces which face and wipingly engage sealing portions 22 of the shaft or rotatable member. The ring portion 30 is flexibly connected at one axial end thereof to the atmosphere axial end of the annular seal body portion 26 by means of a relatively thick diaphragm portion 40.

The outer bearing race member 12 is provided with an internal annular groove 13 and the axial portion 28 of the annular seal body 26 is provided with a corresponding radially, outwardly projecting annular rib 29 which is inserted within groove 13 when the seal is in an installed position. In the preferred embodiment, a circumferentially perforated frusto-conical reinforcing member 42 is embedded in the elastomeric body 26 and has a sufficient axial dimension so that it extends beyond the radial sides of rib 29 on the lubricant chamber side of the seal and substantially to the opposite axial side of seal body 26. The frusto-conical reinforcing member 42 is radially dimensioned so that a substantial elastomeric cushion is provided between frusto-conical member 42 and the outer bearing race 12, and so that the radial thickness of elastomeric material between the lubricant side edge 44 of frusto-conical member 42 and outer race 12 is substantially less than the thickness of elastomeric material between the frusto-conical member 42 and outer race 12 at outer edge 46 of seal body portion 28. The frusto-conical member 44 firmly supports the axial portion 28 of seal body 26 in sealing engagement with outer bearing race 12 and supports the remaining portion of seal body 26, which extends outside of the bearing race 12, against radial deformation. On insertion of the seal portion 28 within race 12, the elastomeric cushion between frusto-conical member 42 and the bearing race surface tends to flow rearwardly against the direction of insertion whereby the seal is readily fitted into place and is seated firmly in place due to the compression of the cushion and the locking action of rib 29 and groove 13. However, a considerably greater force is necessary to dislodge the seal from the outer bearing race since the elastomeric cushion between the frusto-conical member and the bearing race will not tend to flow in the direction of the lubricant chamber due to greater diameter of the frusto-conical ring on the lubricant side of rib 29. This structure gives the seal considerable resistance against being blown out by pressures built up within the lubricant chamber.

The seal body portion 30, which carries a plurality of sealing lips, is relatively heavy and connected to seal body 26 by a relatively thick diaphragm 40 so as to withstand the severe operating conditions to which the seal is exposed. Seal lip 32 diverges outwardly in the direction of the lubricant chamber to prevent the egress of lubricant and seal lips 34, 36 and 38 diverge in the direction of the atmosphere and provide further obstructions to the egress of lubricant and are also effective in preventing the ingress of dirt and other deleterious material.

A feature of the present invention lies in providing an automatically opening and closing vent through the diaphragm portion 40. As shown in Figures 3, 4 and 5, the vent is preferably formed by providing an opening 48 in diaphragm 40 which is normally closed by a second relatively thin diaphragm portion in which is provided a slit 52. In operation, excessive pressures within the lubricant chamber will cause diaphragm 50 to collapse outwardly sufficiently to permit the escape of air or excessive lubricant. On the other hand, it has a sufficient thickness and inherent resiliency so that the diaphragm 50 will resume its normally closed position on the release of pressure to prevent the ingress of dirt and the like. When conditions of partial vacuum are developed within the lubricant chamber as, for example, due to the cooling of the bearing mechanism, diaphragm 40 will collapse inwardly just sufficient to permit the ingress of air to equalize pressures and will resume a closed position as soon as pressure is equalized to prevent the ingress of dirt, water and the like.

The diaphragm 40 may be provided with a second diaphragm as shown in Figure 6 which consists of a diaphragm having a concave configuration in the direction of the atmosphere. This diaphragm has a greater surface exposed to lubricant chamber pressures whereby lesser lubricant chamber pressures are effective in causing diaphragm 54 to open. However, when partial vacuum conditions are developed within the lubricant chamber, the atmospheric pressure will tend to maintain diaphragm 54 in a closed position thereby preventing the ingress of deleterious materials.

Another feature of the present seal lies in providing perforations 43 in frusto-conical member 42 which are disposed outwardly of axial portion 28 of the seal body. These perforations not only insure that the seal body is firmly molded to the frusto-conical member 42, but also provide an area in which a sharp instrument may be inserted and project upwardly to remove the seal from the bearing installation.

The present seal lends itself to simple and mass production manufacture. The frusto-conical member 42 may be readily positioned in a mold due to the proximity of its outer end to the outer end of seal body 26 and the opening 48 and diaphragms 52 and 54 may be integrally formed in the molding operation. The seal may be molded and vulcanized in a manner well known in the art, and the aperture or slit in the diaphragm portion may be provided by subsequently slitting the diaphragm with a knife or puncturing it with a needle or by any other suitable means.

By the term elastomeric material throughout the specification is meant any rubbery materials widely used and well known in the fluid seal art, for example, natural rubber, butadiene styrene copolymers, butadiene acrylonitrile copolymers, polychloroprene, compatible mixtures of the above, and other useful natural and synthetic materials having similar characteristics. Preferred materials for use in the present seal are those having a high degree of resistance to heat and lubricating oils and greases.

A related fluid seal is disclosed in copending application, Serial No. 519,573, assigned to the assignee of the present invention.

While the embodiments of the present invention as herein disclosed constitute preferred forms, it is to be understood that other forms might be adopted.

What is claimed is as follows:

1. A fluid seal adapted for positioning across an annular lubricant chamber between a pair of relatively rotatable members, said seal comprising an annular elastomeric body portion adapted for immovably and sealingly engaging one of said members, a sealing lip portion adapted for wipingly engaging said other member, a relatively heavy diaphragm portion integrally connecting said body portion and said sealing lip portion and flexibly holding said sealing lip portion in wiping engagement with said other member, and a normally closed pressure release means associated with said diaphragm portion operative to relieve pressures or partial vacuum developed within said lubricant chamber and prevent the passage of dirt, water and the like into said lubricant chamber.

2. A fluid seal adapted for positioning across an annular lubricant chamber between a pair of relatively rotatable members, said seal comprising an annular elastomeric body portion adapted for immovably and sealingly engaging one of said members, a sealing lip portion adapted for wipingly engaging said other member, a relatively heavy diaphragm portion integrally connecting said seal body portion and said sealing lip portion and flexibly holding said sealing lip portion in wiping engagement with said other member, said diaphragm portion having at least one portion of reduced axial thickness whereby a second diaphragm is formed, said second diaphragm having a normally closed slit whereby said second diaphragm is operative to relieve pressures or partial vacuum developed within said lubricant chamber and prevent the passage of dirt, water and the like into said lubricant chamber.

References Cited in the file of this patent

UNITED STATES PATENTS

| | | |
|---|---|---|
| 2,181,203 | Reynolds | Nov. 28, 1939 |
| 2,386,496 | Northup | Oct. 9, 1945 |
| 2,417,390 | Winkeljohn | Mar. 11, 1947 |
| 2,486,088 | Yaros | Oct. 25, 1949 |
| 2,572,422 | Agger | Oct. 23, 1951 |

FOREIGN PATENTS

| | | |
|---|---|---|
| 580,871 | Great Britain | Sept. 23, 1946 |